March 4, 1958 R. E. ASHBY 2,825,303
POULTRY WATERER VALVE HOLDER
Filed Aug. 15, 1955

Ralph E. Ashby
INVENTOR.

BY

United States Patent Office 2,825,303
Patented Mar. 4, 1958

2,825,303

POULTRY WATERER VALVE HOLDER

Ralph E. Ashby, Downsville, La.

Application August 15, 1955, Serial No. 528,446

2 Claims. (Cl. 119—81)

This invention relates generally to poultry waterers and more particularly to an improved manner of attaching one end thereof to a standpipe.

An object of this invention is to provide a poultry waterer trough with a valve having a valve operating lever from which the trough is suspended together with a rigid pipe extending from the valve and a flexible conduit connecting the rigid pipe with the standpipe together with a rigid support adjustably secured to the standpipe and/or the rigid pipe whereby the entire valve assembly may be easily adjusted with respect to the standpipe thereby easily adjusting the height of the watering trough.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
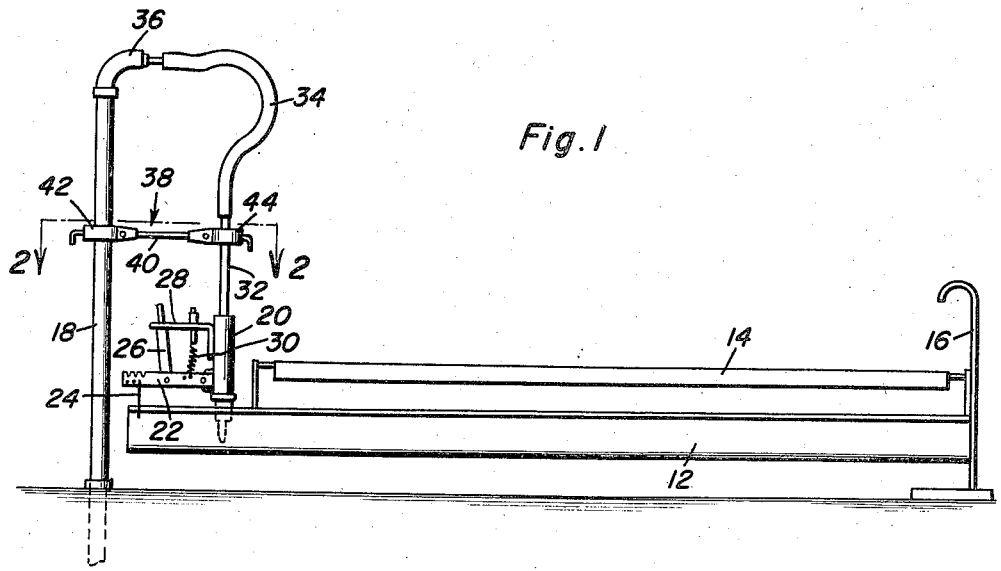
Figure 1 is a side view of the poultry waterer having the principles of the invention applied thereto in a practical embodiment.
Figure 3:
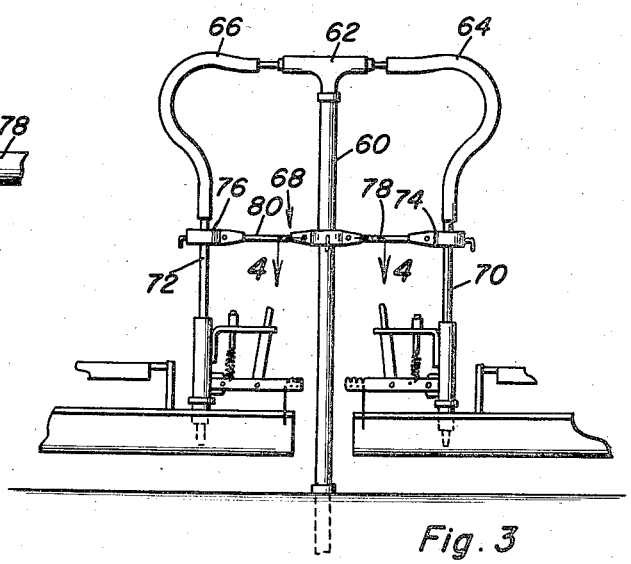
Figure 3 is a fragmentary elevational view of a modified form of the invention where two watering troughs are connected to and fed by a single standpipe.
Figure 2:
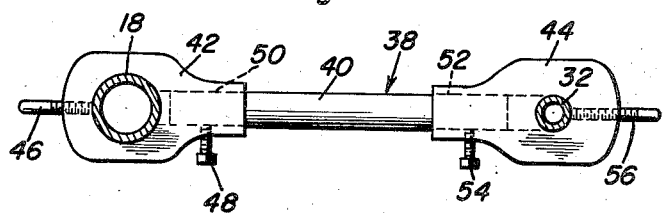
Figure 2 is an enlarged sectional view taken on line 2—2 of Figure 1 and in the direction of the arrows.

In the accompanying drawing the trough 12, anti-roosting baffle 14 and end support 16 are standard parts well known in the art. In poultry watering, the usual construction and arrangement is to provide a standpipe 18 to which is rigidly attached a valve of the drip-type. In Figures 1 and 3 two embodiments of an improved valve and therefore trough suspending means are illustrated. The valve 20 of Figure 1 has a valve operating lever 22 extending laterally from its body, and the lower end of the valve 20 is located near and in the confines of the trough 12. A chain or wire 24 is secured to the valve operating lever 22 and to the end of the trough opposite from that connected to support 16. The lever pivot 26 has its upper end floatingly mounted in bracket 28, and there is an adjustably mounted spring 30 which reacts on the bracket 28 and the lever 22. In this way, when trough 12 is empty, spring 30 holds the lever 22 in such position that valve 20 is open. As the trough gets its water from valve 20 it becomes heavier and pulls the lever 22 about the fulcrum formed by arm 26 thereby actuating the valve 20 toward the closing position. Finally, when a sufficient amount of water enters trough 12, lever 22 is pulled far enough about fulcrum 26 to close the valve 20, and then the chickens or other poultry may partake of the liquid from the trough 12.

A rigid pipe 32 is secured to valve 20 and there is a flexible tube 34 secured to rigid pipe 32 and to the elbow 36 at the upper end of standpipe 18.

Rigid support 38 is adjustably secured to the standpipe 18 and to the rigid pipe 32. This support consists of a bar 40 having a bracket 42 at one end and a bracket 44 at the opposite end thereof. Bracket 42 has an aperture in it through which standpipe 18 passes. A screw 46 carried by bracket 42 bears against the outer surface of pipe 18 in order to hold the bracket in a selected position on the standpipe 18. Setscrew 48 is carried by bracket 42 and bears against an end of the bar 40 that is located in bore 50 of bracket 42. The opposite end of bar 40 is disposed in bore 52 of bracket 44 and is held there by means of a setscrew 54. By virtue of the particular mount for each end of bar 40, that is, the bores 50 and 52 with setscrews 48 and 54, the valve 50 may be rotationally adjusted to the proper position and held in place. This is so inasmuch as the rigid pipe 32 is passed through an opening in the bracket 44, and this bracket is held fixed in place on rigid pipe 32 by means of a setscrew 56.

By the above described rigid support 38 and flexible tube 34, the end of the trough 12 may be easily adjusted to the desired, correct height for poultry watering. Moreover, regardless of the height of trough 12, the lower end of the nozzle on valve 20 is always maintained within the trough 12 to prevent splashing.

Figure 4:
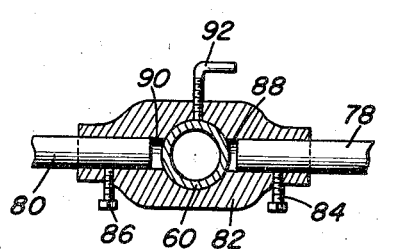
Figure 4 is an enlarged sectional view taken substantially on the line 4—4 of Figure 3 and in the direction of the arrows.

In the embodiment of Figures 3 and 4, standpipe 60 has a T 62 at the top thereof feeding flexible tubes 64 and 66, respectively. Support 68 is designed to accommodate two rigid pipes 70 and 72, respectively, and the remainder of the structure is identical to that described in connection with Figure 1 and it is duplicated. Rigid support 68 has adjustable clamps 74 and 76 at the ends thereof, these adjustable clamps being identical in construction and function to the bracket 44 which functions as a clamp. Rods 78 and 80 extend from clamps 74 and 76 and are connected to clamp 82 by means of setscrews 84 and 86, respectively. The inner ends of the rods 78 and 80 are located in bores 88 and 90 formed in the clamp 82 and are rotatable therein to a selected position where they are held in place by means of setscrews 84 and 86. A screw 92 is threadedly carried by the body of clamp 82 and bears against the outer surface of standpipe 60. Accordingly, the rigid support 68 may be vertically adjusted on the standpipe 60 and held in place by tightening screw 92.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A poultry feeder comprising a water conducting standpipe, a fitting on said standpipe, a flexible hose connected at one end to said fitting, a watering trough, a valve arranged with a discharge outlet directed toward the interior of said trough, a valve operating lever connected with said valve, means connecting said trough to said lever so that said lever at least partially supports said trough and the lever is actuated in response to the combined weights of the trough and the water contained in the trough, a rigid pipe operatively connecting said valve to said flexible hose, a rigid support for said valve, said support having an adjustable bracket to maintain said valve in a selected position and thereby hold said end of said trough at a selected elevation, said adjustable bracket having a bore through which said standpipe passes, a screw arranged to hold said bracket secured to said standpipe, a bar connected to said bracket, a second bracket connected to said bar, and means adjustably securing said second bracket to said rigid pipe.

2. A poultry feeder comprising a water conducting standpipe, a fitting on said standpipe, a flexible hose connected at one end to said fitting, a watering trough, a valve arranged with a discharge outlet directed toward the interior of said trough, a valve operating lever connected with said valve, means connecting said trough to said lever so that said lever at least partially supports said trough and the lever is actuated in response to the combined weights of the trough and the water contained in the trough, a rigid pipe operatively connecting said pipe to said hose, a rigid support for said valve, said support having an adjustable bracket to maintain said valve in a preselected position and thereby hold said end of said trough at a selected elevation, said adjustable bracket having a bore through which said standpipe passes, a screw carried by said adjustable bracket and engageable with said standpipe to hold said adjustable bracket in selected positions on the standpipe, said standpipe having a pair of aligned passages that are perpendicular to said bore, a bar in one of said bores, a second bracket attached to the outer extremity of said bar, means on said second bracket for engagement with said rigid pipe in order to hold said rigid pipe in selected positions with respect to said second bracket, and a second bar carried by the other of said passages and adapted to support a second valve and trough with an operative connection to said standpipe.

References Cited in the file of this patent

UNITED STATES PATENTS

| | | |
|---|---|---|
| 2,512,839 | Pruitt | June 27, 1950 |
| 2,541,622 | Toadvine | Feb. 13, 1951 |
| 2,585,698 | Spring | Feb. 12, 1952 |
| 2,654,346 | Goff | Oct. 6, 1953 |
| 2,686,029 | Raymond | Aug. 10, 1954 |
| 2,703,098 | Smallegan | Mar. 1, 1955 |
| 2,727,492 | Hatcher | Dec. 20, 1955 |
| 2,742,920 | Tillman | Apr. 24, 1956 |